March 21, 1944.    J. R. McDERMET    2,344,554
DEAERATION OF LIQUIDS
Original Filed May 28, 1940    5 Sheets-Sheet 2

March 21, 1944.  J. R. McDERMET  2,344,554
DEAERATION OF LIQUIDS
Original Filed May 28, 1940  5 Sheets-Sheet 3

INVENTOR
John R. McDermet
By
Thomas G. Miller
his attorney

March 21, 1944.   J. R. McDERMET   2,344,554
DEAERATION OF LIQUIDS
Original Filed May 28, 1940   5 Sheets-Sheet 4

INVENTOR
John R. McDermet
By
Thomas G. Miller
His attorney

March 21, 1944. J. R. McDERMET 2,344,554
DEAERATION OF LIQUIDS
Original Filed May 28, 1940  5 Sheets-Sheet 5

INVENTOR
John R. McDermet
By
Thomas G. Miller
His attorney

Patented Mar. 21, 1944

2,344,554

UNITED STATES PATENT OFFICE 2,344,554

DEAERATION OF LIQUIDS

John R. McDermet, Hempfield Township, Westmoreland County, Pa., assignor to Elliott Company, Pittsburgh, Pa., a corporation of Pennsylvania Refiled for abandoned application Serial No. 337,645, May 28, 1940. This application September 5, 1941, Serial No. 409,740

17 Claims. (Cl. 183—2.5)

This invention relates to the deaeration and purification of liquids, and particularly to the heating and deaeration of liquids by the application of sprays. This case is a refile for abandoned application 337,645, filed May 28, 1940.

It deals with a spray type of deaerator that can be effectively employed in marine work; the apparatus must be capable of operation while the vessel is rolling, pitching, or tossing. In an installation of this type, particularly for naval vessels, considerations of compactness, lightness, simplicity, and foolproofness must be met.

In an ordinary type of deaerator having trays, the liquid or feed water that is to be heated and deaerated can be progressively broken up without particular regard to the time element, but in an apparatus for marine work, the unit must be compact from the standpoint of head-room space, and for this reason, the time element becomes very important. The tilting of the apparatus also limits the effectiveness of trays.

In the present invention, I have incorporated the condenser within the unit, itself, and have eliminated moving and all unnecessary parts and so utilized the necessary parts that a maximum efficiency and effectiveness of deaerating action are obtained within a minimum space and are also obtained to deaerate contaminated liquids within a minimum time period. Spray devices are used throughout.

In a unit employed for this purpose, it is customary to specify that it shall be effective from 3% of its rated power to 110% of its nominal rated capacity. A vessel may be called upon to operate for about 25% of its life at normal rated capacity, 3% at overloads, and 72% of the period at minimum loads. Thus, the deaerators should effectively and efficiently operate over the entire range.

If steam velocity is alone relied upon to effect spraying, and the velocity is created through a throttling valve, as has heretofore been customary, it is apparent that a great deal of automatic adjustment is required for this extreme range of operation to provide the variable quantities of steam. In addition, the temperature levels from which the water is initially heated are extremely variable due to temperature conditions of the particular body of water in which the ship is cruising.

For example, a typical installation provides a variable steam orifice through which varying quantities of the fluid required for different rates of operation are passed. This variable orifice is part of a pressure loaded valve that is automatically adjusted to maintain a constant pressure drop at a substantially constant velocity for the issuing steam. It is apparent that the throttling action and pressure drop involve a material decrease in temperature of the steam. In addition, the operating parts are exposed to heavy reactions and to hydraulic water hammer upon its members, due in part to the varying orifice. Consideration must then be given to increasing the weight of the operating parts so that they will be able to withstand the shock loads.

In view of the above considerations, it has been an object of my invention to provide new and improved deaeration procedure and apparatus therefor.

Another object has been to eliminate the disadvantageous features of deaeration apparatus employing a variable or adjustably valved steam supply orifice.

Another object has been to develop a spray type of deaerator for marine installations of improved efficiency.

These and many other objects of my invention will appear to those skilled in the art from the specification, the drawings, and the claims.

Figure 1:
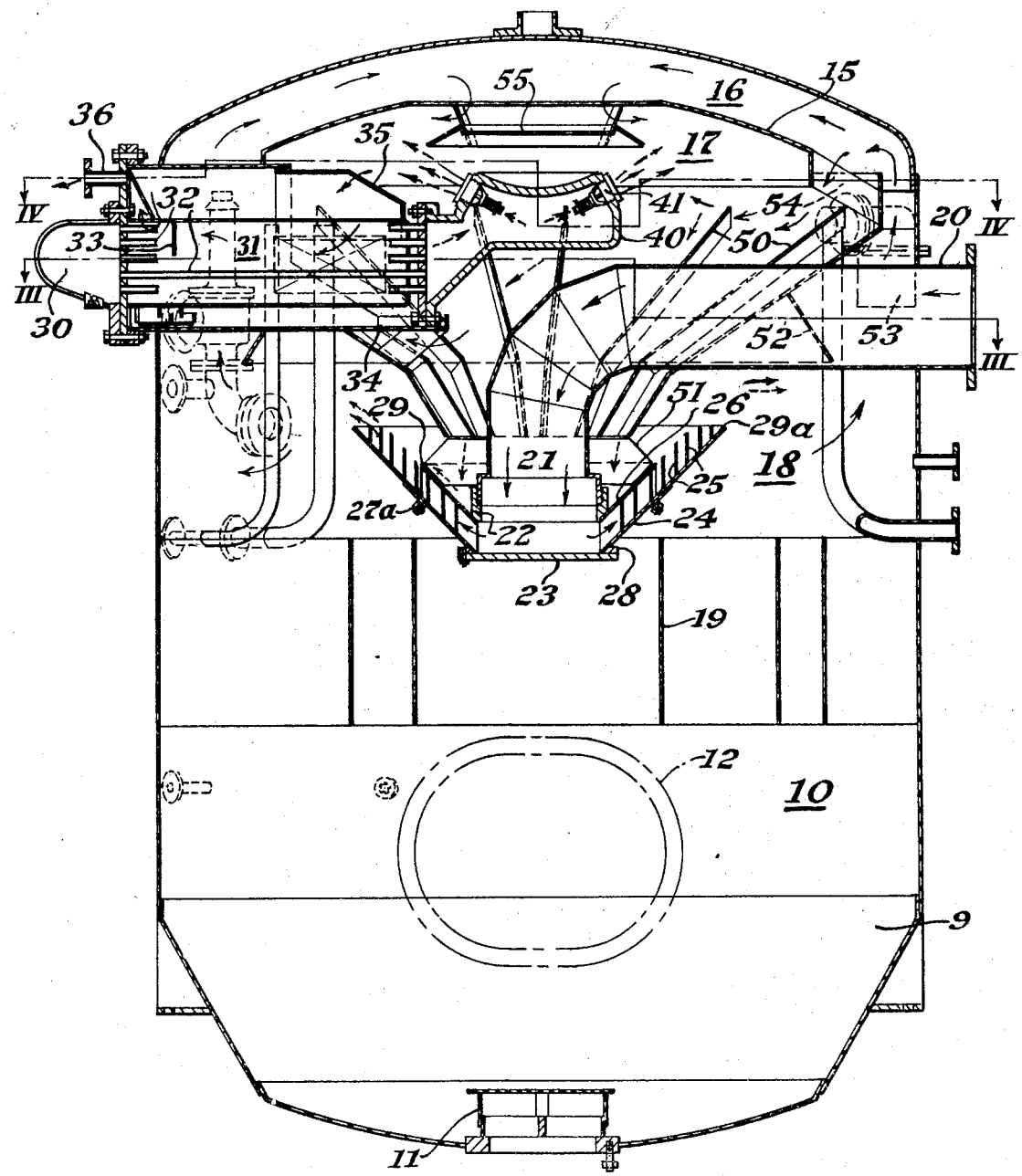
Figure 1 is a vertical sectional view in elevation of a deaerator unit or apparatus employing my invention taken on the line I—I of Figure 3.
Figure 2:
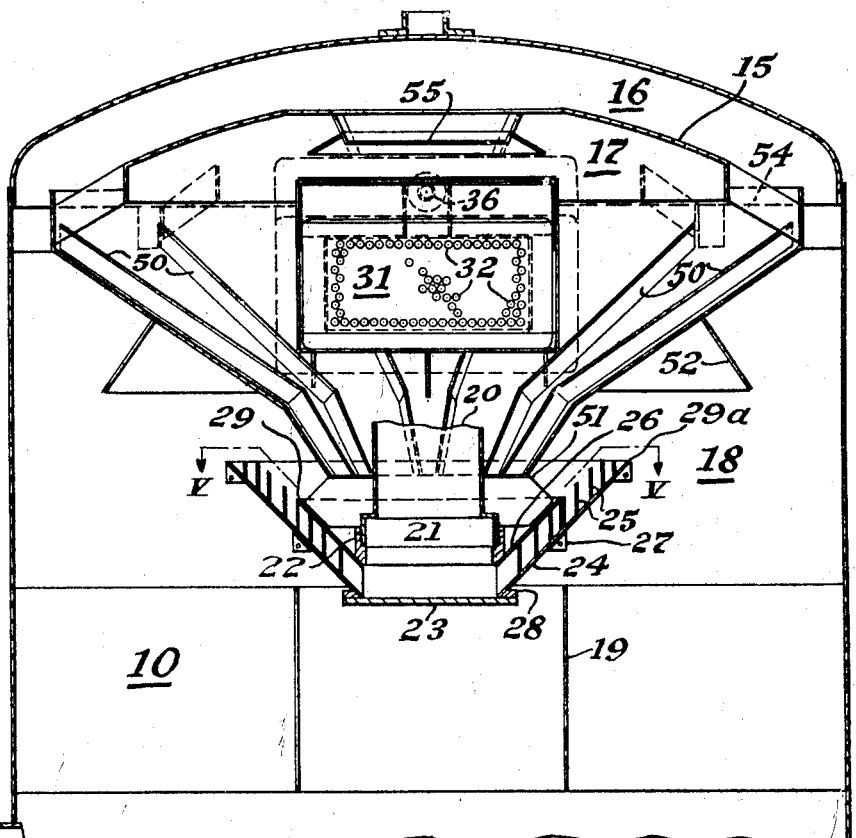
Figure 2 is a sectional elevation taken at substantially right angles to Figure 1 and along the line II—II of Figure 3.

As shown particularly in Figures 1 and 2, a deaerating apparatus constructed in accordance with my invention has been designated generally by the numeral 10. This unit comprises shell-like wall portions of suitable metal provided with inspection openings such as 12 and 13 and having a hooded outlet 11 for the deaerated liquid 9 that is collected in the bottom portion of its lower or final deaeration chamber 18.

The unit 10 also has an upper or preliminary heating and deaeration chamber 17 and an auxiliary or supplementary chamber 16 separated therefrom by a wall portion 15 that provides an annular space along the upper or top portions of the casing or shell for steam travel.

Steam is introduced into the unit 10 through an inlet pipe or conduit 20. This pipe, in effect, enters the unit 10 substantially midway between the upper and lower chamber portions 17 and 18 and turns downwardly substantially centrally of the space at 21 to deliver steam into the lower chamber 18. The delivery of this steam will be later described.

Contaminated water or the liquid to be deaerated is introduced into the unit 10 through a condenser inlet chamber 30. The condenser 31 is of a suitable surface type having water tubes 32 extending lengthwise thereof and delivering partially heated water into a centrally disposed liquid supply chest 40. The chest 40 like the pipe 20 has a heat exchange relation with the fluids in the chamber into which it projects. It will be apparent that the condenser 31 in extending into the upper deaeration chamber also has a heat exchange relationship with the fluids in such chamber. Thus, the water may be further heated in the chest 40 before it is sprayed outwardly through spray elements 41. As shown, the chest 40 has a series of outwardly and upwardly directed spray elements or nozzles 41. In the apparatus disclosed, twelve of these nozzles 41 have been mounted about a centrally-located peripheral portion of the chest 40 to spray water into the upper chamber in the form of a series of individual conical sprays that are uniformly distributed to provide in combination a conically-shaped spray. The water thus introduced mixes with at least partially contaminated steam, causing it to condense.

Figure 3:
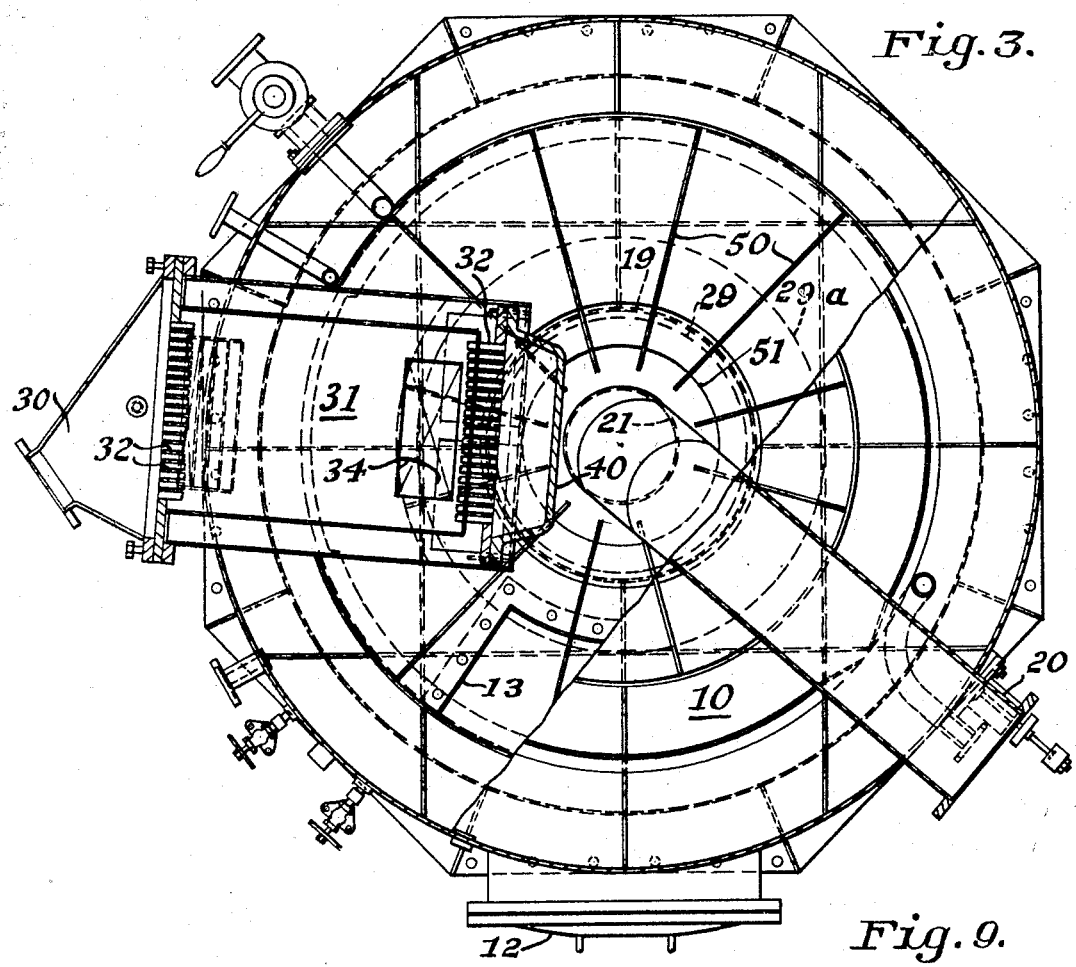
Figure 3 is a top plan view in section taken along the line III—III of Figure 1.
Figure 5:
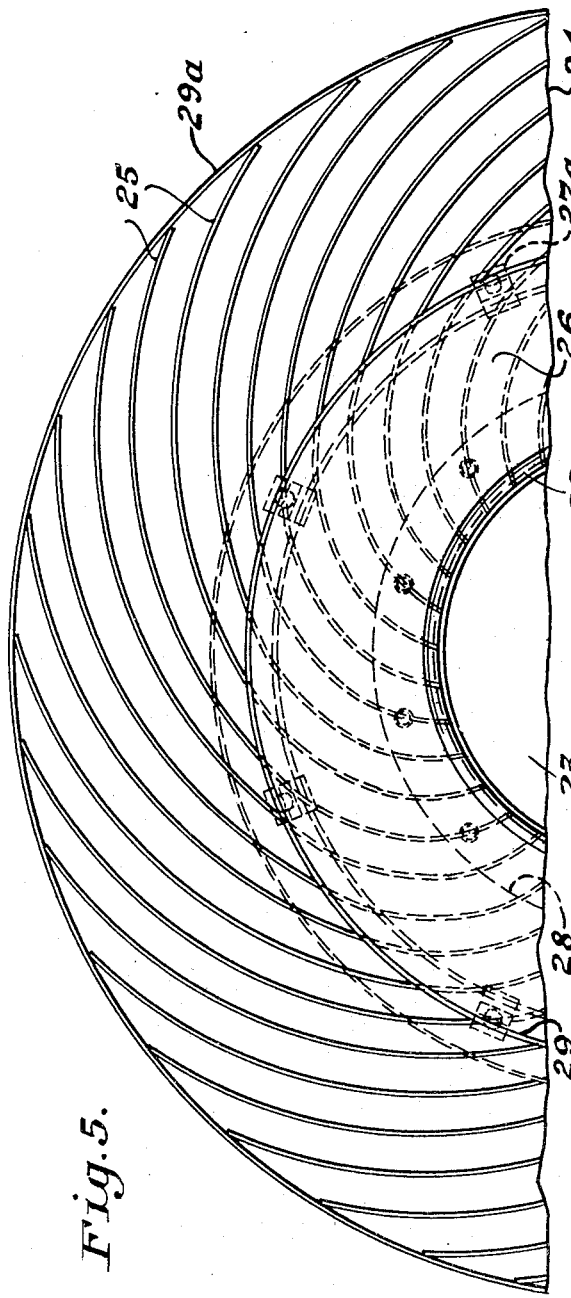
Figure 5 is an enlarged top sectional detail taken along the line V—V of Figure 2 and showing a half of a substantially symmetrical conic shaped guide.

The liquid spray into the upper deaeration chamber 17 is effected in such a manner that the condensing steam heats the water to substantially steam temperature. The heated and partially deaerated water and condensed steam fall from the upper heating chamber 17 between baffle plate members 51 in the lower deaeration chamber 18. The members 51 permit the water to fall upon an inside, conical-face, guide member 26, down and along which it will run until a pool is formed between it and the outside wall of the portion 21 of the steam inlet tube. As shown in Figures 1, 3, and 5, members 51 are mounted on and set within the conic guide member 26 and, in effect, provide a continuation of upper baffles 50; they provide a substantially uniform distribution of the water and prevent surging and splashing in the basin formed by the conic guide member 26. It will thus be apparent that the water is directed radially outwardly in segregated flow paths and then downwardly towards the segregated flow paths of the steam. The arrangement is such that the water is directed under both low and high load conditions substantially uniformly and continuously about the steam passage means 25. It will also be noted that the arrangement of the vanes or partitions 25 is such that the steam will, in effect, move outwardly in a vortex-like path. When I speak of a vane or a partition, I have reference to any suitable means such as a wall or other barrier dividing one part, passageway, or chamber from another.

It will be noted that the water thus collected is in a heat exchange relationship with the steam entering through the inlet 21. The water then spills or falls over an annular edge or circular lip portion 29 of the inside guide member 26 upon an outer guide member 24. Steam flows downwardly along the member 21 and then upwardly between the outside of the member 26 and the inside of the outer conical guide member 24 that is spaced from the member 26. A plurality of spiral-like vanes or partition 25 are positioned or extend upwardly from the inner periphery of the outer conical guide member 24 and, in effect, provide a series of outwardly running spaces or passages for the steam which enters the spacing between the lower portions of the members 24 and 26.

Due to the conical shape of the outer guide member 24, I change the radius of curvature from point to point in order to provide substantially parallel vanes or partitions within the space limitations involved. That is, the spacing between the vanes 25 will tend to increase in size or diverge outwardly. The bounding surfaces between the vanes are thus substantially parallel conical envelopes, see particularly Figures 5, 6, and 7. The vanes or partitions 25 traverse peripherally around the envelope and rise upwardly. The guided flow passages between vanes provide a force component directing the flow peripherally therethrough, while at the same time it exerts an upward lifting force against gravity. In this manner, I provide a longitudinal path of flow travel within a limited space to give maximum mixing and deaeration action between the steam and the liquid. I have successfully used vanes or partitions with angles of between 90 and 150°, this being the included angle between their exit and their inlet edges measured on the plan view. This may be measured by placing the mixing device so that its steam passage portion 22 extends vertically from a horizontal plane and then projecting a point from the entry and exit ends of a given passage and connecting each point with a radial line drawn from the vertical axis. The included angle between these two radial lines is the angle referred to herein. The choice of the angle is determined by the maximum value that can be secured without unduly congesting the passages; and, from a practical standpoint, the angle between the inlet and the outlet edges is made as large as conditions will permit.

In operation, the steam enters through the central steam pipe 21 and is conducted to the inlet edges of the vanes or partitions 25. It then flows peripherally outwardly and upwardly towards the discharge end or lip 29a.

The water that is brought down from the heating compartment 17 between spaced-apart baffles 51 to the storage pool provided by 26, falls over the annular or circular edge 29; and, under low or medium load conditions it flows counter and downwardly and substantially parallelly to the upward flow of substantially pure steam along the spiral vane or partition-formed passages between guides 24 and 26.

I have designated the path of the water by broken or dotted arrows and the path of the steam by solid arrows. It will be noted that partially contaminated steam in the lower or final deaeration chamber 18 passes upwardly through annular openings 53 into an upper heating compartment 16 formed by wall portions 15, entering through opening 53. It then flows along two paths, the lesser portion following the space 16 upwardly, and a greater portion following the opening 54 downwardly into the chamber 17. The portions of steam flowing in the chamber 16 are, as noted, in heat exchange relationship with the chamber 17 and flow downwardly and outwardly along peripheral side portions of a central baffle member 55 to directly mix with and preheat the water being sprayed into chamber 17. Substantially all of the steam is condensed by the water sprayed through the nozzles 41.

The non-condensible gases and a small portion of the steam enter the condenser 31 through inlets 34 and 35 and are directed by baffles to flow parallel to the tubes 32. The condenser suitably vents the condensed steam into the unit 10 through openings 34a in its bottom shell (see Figure 3) and vents the gases through an outlet 36. After entering the condenser 31 at the two inlets, the steam passes lengthwise along the tubes and around the baffle arrangement. The particular arrangement is especially adapted to disengage gases and vapors from the liquid to permit drainage of the vent condenser and to avoid carrying liquid into it. That is, the openings such as 34a and 35 are so located as to minimize the entry of portions of the water being deaerated. This is occasioned by the fact that the condenser is located in a region of heavy water spray.

Figures 8, 9:
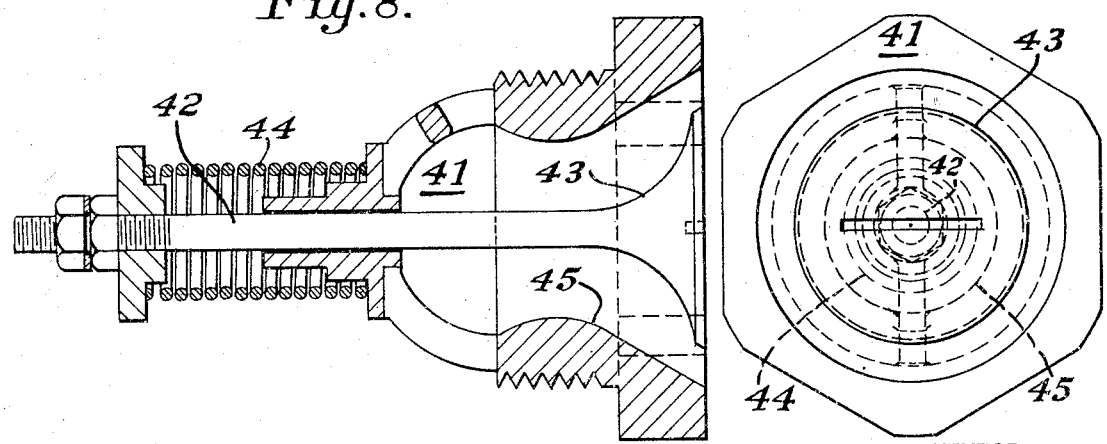
Figure 8 is an enlarged longitudinal sectional view showing a detail of a water supply nozzle.
Figure 9 is an end view of the same.
Figure 4:
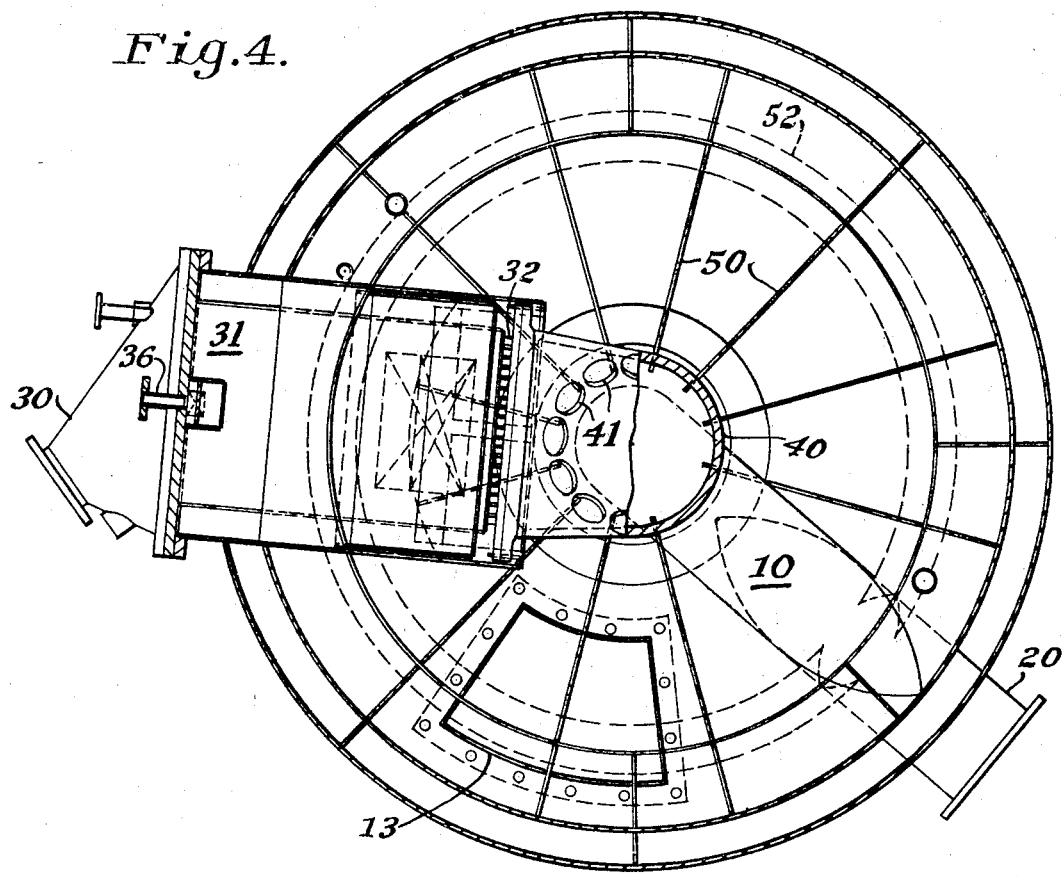
Figure 4 is a top plan view in section taken along the line IV—IV of Figure 1.

The construction of the water spray nozzles 41 is shown particularly in Figures 8 and 9 of the drawings; the nozzle 41 is shown in an "open" position in these figures. These valves are normally open. As shown, these nozzles are what may be termed a poppet valve type having holding springs 44, removable valve stems 42, and valve heads 43 which seat upon outwardly-diverging conical portions of a Venturi-shaped inner wall portion 45. The arrangement is such that water is sprayed outwardly in a conical sheet under a velocity head. The valve head 43 moves within the Venturi-type throat according to the amount of opening desired, and is highly stable in operation; a pressure head of water is changed into a velocity head and accelerated; and, the transfer from the inner portion of the nozzle to the outer portion is accomplished without appreciable destruction of velocity. In other words, the water is changed from a pressure head to a velocity component without a substantial recovery of pressure and is discharged into the space 17 at a point of maximum velocity, so that the upstream pressure side of the valve produces a maximum velocity.

This arrangement produces a very stable type of operation and there is no evidence of valve chatter. The valve 41 distributes the water uniformly and is entirely free from vibration and chatter. It, in effect, floats between the liquid and is balanced between the cone formed by inner and outer or upstream and downstream velocity streams. The shape of the Venturi throat 45 and the valve head 43 is such that the conical spray form is maintained for light as well as heavy loads. The steam penetrates into the interior of the hollow conical water spray, and thus, there is a maximum mixing, since it also contacts exterior portions of the conical water spray. This is insured by cutting off a section of the conical water sprays with a baffle 15, and through this cut-off area, feeding the stream to the interior, relying upon the velocity of the water to carry non-condensible gases to the end of the projection path where complete turbulence exists. It also reinforces the construction.

Surge plates or break-up ribs 60 are incorporated in the inside of the tank by a conic-shaped separator member A and surround the steam valve or the steam entrance. They serve to break up the wave action of the water due to rolling and pitching of the ship. The arrangement protects the apparatus and its parts from the continuous slap of the waves on its interior. The member A separates chamber 17 from chamber 18.

As previously pointed out, one of the problems has been to devise a steam supply apparatus or agency which will be effective at minimum loads of 3% of capacity as well as at loads above normal capacity. The present arrangement effects this result without any loaded valve or steam adjustment orifice mechanism. The operation of the present arrangement may be divided into three cycles or phases: In the first place, at low loads such as at 3% of rated capacity, water is delivered over the water admission lip 26 into the passages between vanes 25 in such a manner that the water distribution is regulated without being affected by the pitch and roll of the vessel. The areas are so proportioned that the water can run downhill through or between the vane channels and in so doing it continually comes into areas of less cross-section as it is proceeding radially inwardly. Eventually it will come into an area where the steam flow is sufficiently rapid to prevent further downward movement. At this stage of the operation, the steam nozzle unit or apparatus has a pulsating effect as the water is driven uphill by trapped stream and over lip 29a. The trapped condition is automatically relieved and the water runs back, and as sufficient water is continuously being added, the condition will be arrived at where a quantity is thrown out equal to the quantity being admitted. However, the portions admitted first go through a turbulent treatment before they can leave. In other words, they are subjected to a cycle of pulsations before they are distributed by the steam. As a result, there is a continual bubbling and reboiling in the vane passages and the water is scrubbed with steam and given a maximum deaeration within a limited time by the steam.

When I speak of "radial" or "radially" in the specification and claims of this application, it will be apparent that I have reference to a rather broad meaning thereof; in other words, such terminology has been employed to refer generally to movement from a somewhat central location or from the mixer outwardly into the chamber, although it will be apparent that this movement may, for example, traverse 180° due to the curvature of the vanes or partitions 25.

In actual operation, as observed through glass windows in the exterior of the shell, water is ejected with a pulsating effect that is visible to the eye; these pulsations are sufficiently rapid and small in magnitude that there is no noise and no measurable fluctuation in pressure upon sensitive gauges. Thus, at this condition of low load, the device is a scrubbing device which is adapted to alter its scheme of operation under higher loads at a point that it automatically selects without any moving parts and without any adjustment whatsoever.

It is apparent that as the load increases, the quantity of steam must be increased in proportion to the increase of water. Therefore, as demand increases, more water is required and more water will be delivered over the lip 26 and more steam will come through the vane or partition passages. In the second phase or stage of operation, the water does not penetrate downwardly into the vane or partition passages below the member 26 but is delivered by a simple flow process upon a curtain of steam to which relative rotation has been imparted by the spiral shape of the vane structure. Again, the conic section comes into utilization as the velocities during this stage are not sufficient to lift the water up against the force of gravity to enable it to clear the elevated discharge edge 29a of the nozzle. However, the steam is supplied in sufficient quantity to provide a measurable kinetic energy and not only has a rotating motion, itself, but is able to impart a rotary motion to the water. The result is that the water is driven up along the inner face or periphery of the cone 24, and between vanes 25 with a rotary motion as a whirling spray of moderate velocity sufficient to disintegrate the water into finely divided portions due to the component of the whirling action. During this cycle, the water is given a whirling motion, mixed with steam, and is scrubbed between the lips 29 and 29a upon the inner periphery of the outer or lower conical guide 24. In this second stage of operation, the device produces a whirling spray, propelled by the steam, and guided and rotated by the vane-like action.

In the third phase, if the water quantities to be handled are still further increased, the steam must likewise increase further and will be emitted from the partition formed vane passages below the lip 26 with greatly increased velocity such that there is a pressure loss and a significant acquired velocity. The larger quantity of water passing over the lip 29 encounters a whirling curtain of steam having a very forceful velocity component; the water is thus not able to penetrate into the vane passages below the member 26. The tendency is for the steam to rise out of the vane or partition-formed passages and propel the water upwardly substantially vertically as well as within the vane passages. In this operation, the water initially moves substantially parallel and in the same direction as the steam.

The spray conditions are extremely chaotic, some of the water, as above explained, being hurled upwardly to subsequently fall back into the steam curtain, some of it being hurled out along the inner passages of the outer guide envelope 24, as in the second phase of the operation. Significantly, there is now plenty of energy to spray the water and there is no difficulty in obtaining effective deaerating and mixing of the water with the steam as it is hurled at random and cannot fall into storage without becoming further entrained with steam curtains emerging from the nozzle. The pattern of distribution of the spray is such that it now has a greater density per cubic foot, a projection upwardly against gravity, and a tendency to fill a much larger liberation space in the interior of 18 than under the first two phases of operation. As a result, the disintegration of the larger quantity of water is effectively completed. The steam guide or nozzle has utilized automatically more available space for water-steam liberation and has added to the effectiveness of the water-steam separation therebeyond. The arrangement provides all the advantages of the variable-controlled orifice for steam distribution without the complication of moving parts and without other disadvantageous features that are inherent in such an arrangement. Furthermore, it provides a new and improved efficiency of action under variable load conditions, particularly from a time-space standpoint, which has never been approached by any apparatus heretofore. Due to its effective utilization of whirls, even at maximum load, the nozzle apparatus operates with less pressure drop than the nozzles of the variable orifice type. This is particularly significant since there is no loss of heat head under heavy load conditions due to throttling losses. It also is highly efficient at low loads which, as previously pointed out, constitute the greater portion of the effective life of a ship's operation. The apparatus brings the liquid containing dissolved gases into solubility equilibrium, with an atmosphere free of such gases within a minimum time period.

Figure 10:
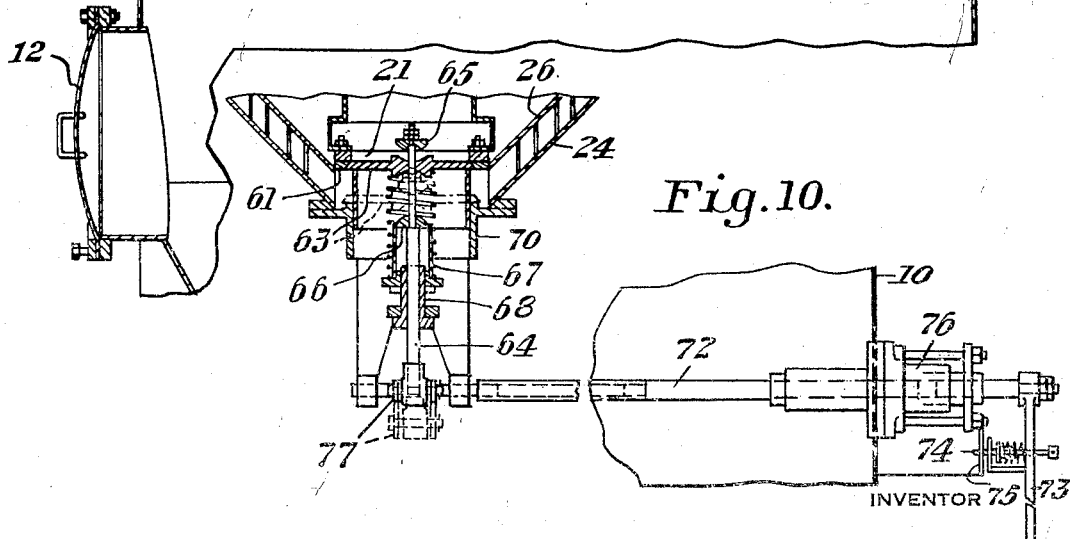
Figure 10 is a sectional detail in elevation of a steam valve arrangement showing a modification.

In Figure 10, I have shown a check valve that is located within the spray nozzle. Its purpose or function is that of a back flow check valve. That is, in naval or marine applications, it is possible that a shell may come through the machinery rooms and break the steam pipe supplying steam to the heater. The water in the interior of the heater, if it is being operated at significant pressure above atmospheric, would boil violently upon the release of pressure and penetrate sufficiently far down into the body of liquid to interfere with boiler feed pump suction conditions. There is also the danger that the water would be sucked up through the steam inlet connections, particularly if there is a failure of steam. If the steam connections are intact, water could flow back into the turbines through their own exhaust piping.

The check valve shown moves to a closed position and to an open position. It moves to its closed position upon a loss of steam pressure to positively cut off the steam lines from the body of the tank. It is automatic in operation and also is capable of hand control. It is spring loaded only to the extent of balancing the gravity forces on its valve disc. It imposes no restriction upon steam flow and could be mounted in the steam line outside of the unit if space conditions permitted.

As shown particularly in Figure 10, the check valve has a valve disc 63 provided with a downwardly-extending cylinder. In the position in the figure, the valve has closed off the steam inlet 21 and is in abutment with its annulus ring portions 61 and with a sleeve portion 70. It constitutes what may be termed a free floating type in that a spiral spring 67 normally tends to edge it upwardly into a closed-off relationship. The valve is moved to an open position manually by lowering the valve rod 64 and associated stop 65 into abutment with a top portion of the valve disc 63. In like manner, it is raised by moving the stop 66 into abutment with the lower face of the disc 63. The valve rod 64 is suitably mounted and sealed within a stuffing box 68. A hand lever 73 mounted outside of the unit 10 can be moved from an open to a closed position after lifting a spring pin detent 74 out of a quadrant 75. This hand lever 73 actuates a shaft 72 which enters the shell of the unit 10 through a stuffing box 76 and actuates one end of a forked or bifurcated rocker or crank arm 77 which, in turn, raises and lowers the valve rod 64.

Figure 7:
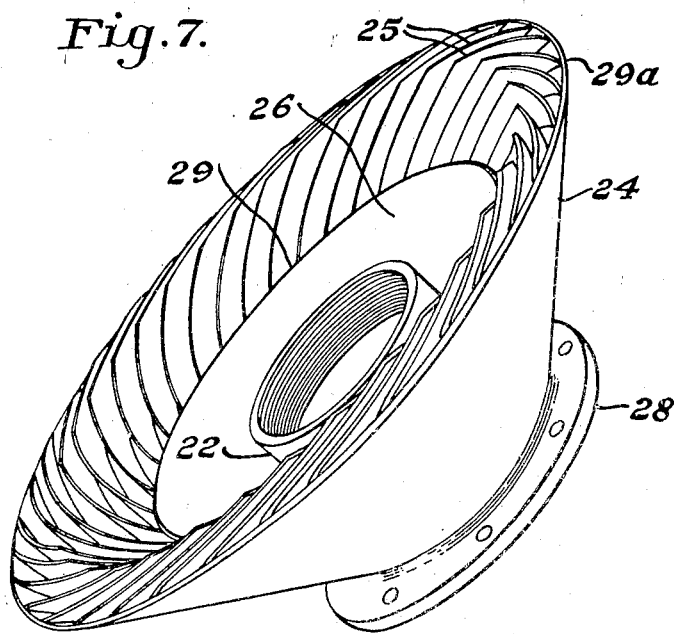
Figure 7 is a side view in perspective showing the apparatus of Figures 5 and 6.
Figure 6:
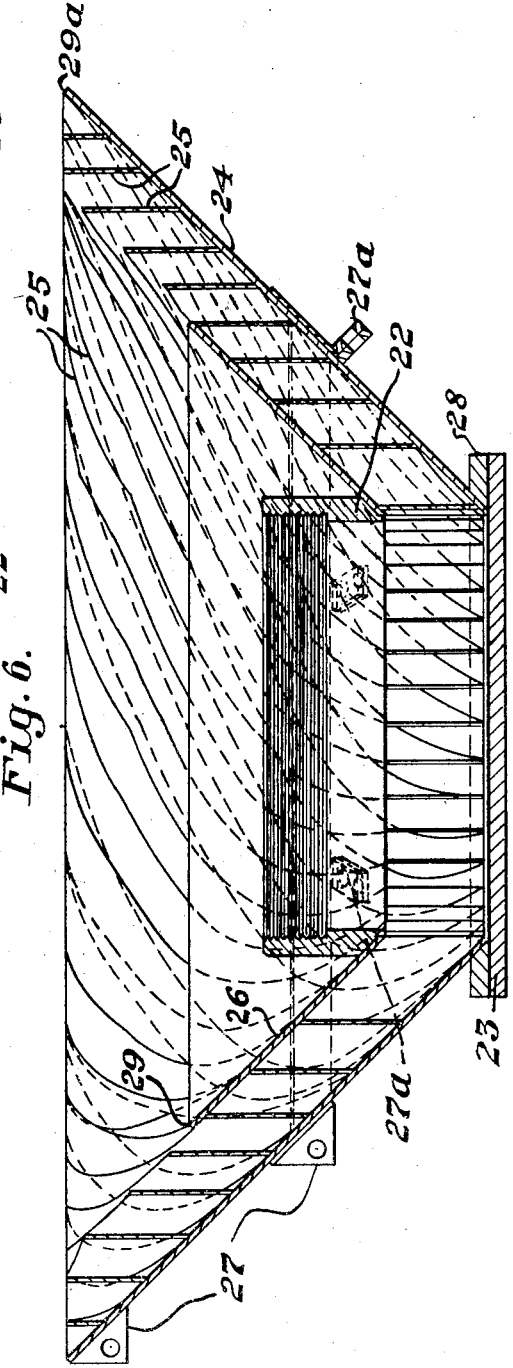
Figure 6 is an enlarged cross sectional view in vertical elevation showing the apparatus detail of Figure 5.

As shown in Figure 7, the steam and water mixer unit may be formed as a unit, for example, by casting, and then mounted by threading its center ring 22 upon the steam inlet pipe portion 21. A bottom plate 23 is shown removably secured to its flanges 28; mounting brackets 27 are also shown in the detail of Figure 6. As shown particularly in Figures 5 and 6, the center ring or annulus member 22 may be separately formed and secured by brackets 27a to the inner guide member 26.

As will be apparent from the previous description, the vanes or partitions 25 extend in a curvilinear radial path along inner face portions of the outer guide member 24 to, in combination with the inner guide member 26, provide a confined curvilinear flow-passage portion or arrangement that will heat and deaerate water under a wide range of load conditions without varying the area of the flow passages or throat portions of the orifice or orifices provided for the issuance of the steam. As a result, the applicant has been the first to eliminate a loaded steam valve and the need for controlling the velocity of flow in accordance with load conditions. It will be apparent that with an increase in quantity of water to be deaerated, the amount of steam produced will be increased; the present arrangement, see for example, Figure 1, does not require a valve means for varying the issuance of the steam into the lower deaeration chamber. As touched upon before, under low load conditions the flow of water is downwardly along the passages between the vanes 25 and in a counter flow direction to that of the steam to effect a pulsating and scrubbing action upon the small quantities of water within the curvilinear spiral flow passages; on the other hand, when the load is increased to a heavier value, the steam and water flow in substantially unidirectional paths, these steam and water paths having the same direction of flow. The present arrangement eliminates the loss of heat and pressure particularly under high heavier load conditions that is the normal accompaniment of throttling losses of a loaded steam valve.

An important advantage of the provision of the curvilinear or spirally arranged deflecting elements 25 on the lower cone 24 is that the slope of the cone in conjunction with the curve of the vanes serves to deflect water from a high point to an abnormally low point on the cone so that with the ordinary rolling and pitching of the ship on which the deaerator is mounted, the channels between the baffles at the point where the steam enters the troughs or channels is never emptied of water. If there were no baffles at all, it is apparent that when the ship rocked so that one side of the cone 24 was nearly horizontal, most of the water in the apparatus would flow out the lower side of the cone, and steam could escape freely between the inner cone 26 and the lower cone 24 in the part of the apparatus which is then tilted to high position. If the vanes 25 were straight radial vanes, water could still run out the low side of the bottom cone when it was so tilted. Because, however, the vanes curve upwardly and outwardly on the inner surface of a cone, the discharge end of any trough will always be higher than the inner end, if that inner end then be on the lower side of the cone. Consequently, the normal pitch and rolling of the ship cannot interfere with the proper functioning of the water and steam contacting apparatus.

Although I have particularly referred to some of the novel features of the invention involved, it will be apparent to those skilled in the art that there are many other features of novelty and that suitable modifications, adaptations, omissions, and additions can be made without departing from the spirit and scope of my invention as set forth in the appended claims.

I claim:

1. Apparatus for heating and deaerating water in a deaeration chamber comprising, means for introducing water to be heated and deaerated into the chamber, a mixer supplying steam to the chamber and having a pair of upwardly and outwardly extending spaced-apart wall portions, at least one of said wall portions being adapted to receive water introduced into the chamber, at least one partition operably positioned to extend along at least a portion of the spacing between said pair of wall portions, and means for introducing steam as well as water received by said above-mentioned wall portion into a heating and deaerating relationship along both sides of said partition.

2. Apparatus for heating and deaerating water in a deaeration chamber comprising, means supplying water to the chamber, means supplying steam for the chamber, a mixer operably positioned within the chamber, said mixer having means for collecting water moving downwardly in the chamber from an upper portion thereof and for then directing it along segregated-radial flow paths, said mixer also having means for directing steam into the chamber along segregated-radial flow paths, at least one of said directing means having portions introducing the segregated water flow paths into heating and deaerating contact with the segregated steam flow paths.

3. Apparatus for heating and deaerating water in a deaeration chamber comprising, means for introducing at least partially contaminated water into the chamber, means for introducing steam thereinto, a pair of spaced-apart cones operably associated with said steam-introducing means and connecting it with an inside of the chamber, partitions extending substantially radially of an inner portion of each of said cones, means for directing the steam along the partitions of the inner portion of one cone, means for directing the water along the partitions of the inner portion of the other cone, and means for directing the water into heating and deaerating contact with the steam over a lip portion of one of said cones.

4. An apparatus as defined in claim 3 wherein partitions extend along and upwardly out of the spacing between said cones, and wherein the cone having the lip portion over which the water moves has a wall portion of a lesser extent than the other cone.

5. Apparatus for heating and deaerating water in a deaeration chamber comprising, means for introducing at least partially contaminated water into the chamber, steam supply means, a mixer operably associated with said steam supply means and having a substantially upwardly-outwardly extending radial flow passage portion for directing steam from said supply means into said chamber, and means operably associated with said mixer having portions separating said flow passage portion into parts for directing the water under operating load conditions into heating and deaerating contact with the steam being supplied and substantially uniformly about and from said passage portion.

6. Apparatus for heating and deaerating water in a deaeration chamber comprising, means for introducing at least partially contaminated water into the chamber, steam supply means, mixer means located within the chamber and operably connected with said steam supply means, said mixer means having substantially radial partition portions providing segregated flow passageways, a substantially continuous annular lip portion operably associated with said mixer means, and means for directing water within the chamber over said lip portion and along said partition portions into heating and deaerating contact with the steam.

7. Apparatus for heating and deaerating a liquid such as water in a deaeration chamber comprising, means for introducing water to be heated and deaerated into the chamber, means for supplying steam and having a pair of upwardly-extending means for introducing the steam therebetween along substantially radially-curvilinear flow paths into the deaeration chamber, and means directing at least partially contaminated water into heating and deaerating contact with such steam.

8. Apparatus for heating and deaerating water in a deaeration chamber comprising, means for introducing at least partially contaminated water into the chamber, a pair of conic shaped means having means therebetween providing a confined-curvilinear flow passage portion, means for directing steam along said flow passage portion and into the chamber, and means directing the water towards the steam adjacent the flow passage portion and into heating and deaerating contact with the steam.

9. Apparatus for heating and deaerating water in a deaeration chamber comprising, means for supplying steam, a pair of spaced-apart cones operably positioned in said chamber and connected to receive steam therebetween from said supply means, said cones being constructed and arranged to direct the steam outwardly into the chamber, said cones providing a restricted throat portion of substantially constant area under variable load conditions, means for introducing water to be heated and deaerated into the chamber, means for directing water in the chamber towards the spacing between said cones and towards said restricted throat portion in such a manner as to scrub the water under low load conditions and to spray the water within the chamber under higher load conditions.

10. Apparatus for heating and deaerating water in a deaeration chamber comprising, means for introducing at least partially contaminated water into the chamber, means for introducing steam into the chamber, means operably associated with said steam-introducing means and having a portion providing a flow passageway into the chamber, said steam introducing means having a restricted throat portion of substantially constant area under variable load conditions, said throat portion being operably associated with said flow passageway to supply steam thereto, and means for directing water towards said flow passageway portion and into heating and deaerating contact with the steam moving therealong.

11. Apparatus for heating and deaerating water in a deaeration chamber comprising, means for introducing water into the chamber in spray form, a partition dividing the chamber into upper and lower portions, means for introducing water from the upper into the lower portion, means for introducing steam directly into the lower portion of the chamber and indirectly into the upper portion of the chamber from the lower portion, and partition means about a top portion of the chamber for directing steam being introduced thereinto upwardly along the top portion of the chamber and then downwardly towards the water being sprayed thereinto.

12. Apparatus for heating and deaerating water in a deaeration chamber comprising, means for introducing water to be heated and deaerated into the chamber, means for supplying steam to the chamber, an upwardly and outwardly inclined and extending member operably positioned in the chamber for collecting water introduced thereinto, a second upwardly and outwardly inclined and extending member having a spaced-apart and operably associated relationship with respect to said first-mentioned member, means operably connecting said steam supply means to the spacing between said members for introducing the steam into the chamber, means positioned to extend along the spacing between said members to introduce the steam into the chamber in substantially-outwardly-radially-extending flow paths, said first-mentioned member having a portion for directing the water collected towards the spacing between said members and into heating and deaerating contact with the steam therein, said last-mentioned means and said members being constructed and arranged in such a manner as to cause the steam to bubble through, agitate and thereby scrub the water under low load conditions and to spray project the water within the chamber under higher load conditions.

13. Apparatus for heating and deaerating a liquid such as water in a deaeration chamber comprising, mixer means, said mixer means having extending wall portions, means for introducing steam along said wall portions, means operably associated with said wall portions for directing the steam therealong in a plurality of substantially-segregated-parallel substantially radial flow paths into the deaeration chamber, and means directing at least partially contaminated water into heating and deaerating contact with such steam flow paths.

14. Apparatus for heating and deaerating water in a deaeration chamber comprising, means for introducing water to be deaerated into the chamber, mixer means having means constructed and arranged to provide extending and confined flow paths for introducing steam into the chamber, means operably associated with said mixer means for directing the water introduced towards and backwardly along said confined flow paths into heating and deaerating contact with the steam at a suitable low load condition and for directing the water substantially upwardly and forwardly along the steam flow path with an increase of load.

15. In a deaerating apparatus for use aboard ships, means for contacting water and steam comprising an upper inverted conical vessel, means for delivering water to the interior thereof, a lower inverted conical vessel spaced below the upper one and having its free edge extending beyond and above the edge of the upper one, means for introducing steam at the center of the lower vessel whereby it may escape between the two conical vessels and contact water flowing over the edge of the upper cone into the lower one, and upstanding baffle means on the surface of the lower cone providing channels leading from adjacent the steam inlet toward the periphery of the said lower cone arranged to deflect water from a higher elevation toward a point of sub-normal level in the lower cone created by the rolling and pitching of the vessel whereby the emptying of the lower cone by the rolling and pitching of the vessel is prevented.

16. In a deaerating apparatus for use aboard ships, means for contacting water and steam comprising an upper inverted conical vessel, means for delivering water to the interior thereof, a lower inverted conical vessel spaced below the upper one and having its free edge extending beyond and above the edge of the upper one, means for introducing steam at the center of the lower vessel whereby it may escape between the two conical vessels and contact the water flowing over the edge of the upper cone into the lower one, and baffle means on the surface of the lower cone extending from the area between the two cones outwardly toward the periphery of the lower cone and provide a plurality of closely spaced troughs, said baffle means being spirally disposed to provide curvilinear troughs therebetween, the slope of the cone and the curve of the vanes cooperating to retain water in the troughs notwithstanding the normal rolling and pitching of the ship on which the deaerator is used.

17. In a deaerating apparatus for use aboard ships, means for contacting water and steam comprising an upper inverted conical vessel, means for delivering water to the interior thereof, a lower inverted conical vessel spaced below the upper one and having its free edge extending beyond and above the edge of the free one, means for introducing steam at the center of the lower vessel whereby it may escape between the two conical vessels and contact water flowing over the edge of the upper cone into the lower one, and an annular series of spirally directed vertical partition elements on the lower cone extending from between the two cones outwardly and peripherally toward the edge of the lower cone, the angle between the inner and outer ends of these partition elements being of the general order of 90° or greater, whereby the passage which is formed between the partitions may not be emptied of the water contained therein during the normal pitching or rolling of the ship on which the deaerator is used.

JOHN R. McDERMET.